United States Patent
Hayashi et al.

(10) Patent No.: US 8,260,983 B2
(45) Date of Patent: Sep. 4, 2012

(54) RECORDING AND/OR REPRODUCING APPARATUS

(75) Inventors: Hisahiro Hayashi, Chigasaki (JP); Toshihiro Kato, Tokyo (JP); Manabu Katsuki, Yokohama (JP); Mitsuo Kurokawa, Fujisawa (JP); Atsushi Fuchiwaki, Yokohama (JP)

(73) Assignees: Hitachi Consumer Electronics Co., Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 12/796,760

(22) Filed: Jun. 9, 2010

(65) Prior Publication Data

US 2011/0022741 A1     Jan. 27, 2011

(30) Foreign Application Priority Data

Jul. 21, 2009    (JP) ................................. 2009-169694

(51) Int. Cl.
*G06F 3/00*       (2006.01)
(52) U.S. Cl. .................... 710/52; 710/7; 710/20; 710/31
(58) Field of Classification Search ......................... None
See application file for complete search history.

(56) References Cited

U.S. PATENT DOCUMENTS

| | | | |
|---|---|---|---|
| 7,447,852 B1 * | 11/2008 | Justiss | ........................... 711/161 |
| 2005/0270877 A1 | 12/2005 | Kinoshita | |
| 2006/0294271 A1 | 12/2006 | Maki | |
| 2007/0019315 A1 | 1/2007 | Tamura et al. | |
| 2009/0187774 A1 | 7/2009 | Minabe et al. | |

FOREIGN PATENT DOCUMENTS

| | | |
|---|---|---|
| EP | 2 079 013 | 7/2009 |
| JP | 2007-4707 | 1/2007 |

OTHER PUBLICATIONS

Seagate: "Seagate Innovation About to Deliver a Windows Vista-Ready Hybrid Drive", Sep. 30, 2006.

* cited by examiner

*Primary Examiner* — Cheng-Yuan Tseng
(74) *Attorney, Agent, or Firm* — Antonelli, Terry, Stout & Kraus, LLP.

(57) ABSTRACT

A recording and/or reproducing apparatus includes a plurality of devices in which a first device has a connecting unit connected with a host device to perform a data transfer with the host device, a second device shares a temporarily recording area with the first device to perform the data transfer between the first and second devices via the temporarily recording area, and the data transfer is performed by using the temporarily recording area shared with the first device and using the connecting unit of the first device when the second device performs the data transfer with the host device, in this way, a power consumption is reduced.

9 Claims, 5 Drawing Sheets

RECORDING AND/OR REPRODUCING APPARATUS

INCORPORATION BY REFERENCE

The present application claims priority from Japanese application JP2009-169694 filed on Jul. 21, 2009, the content of which is hereby incorporated by reference into this application.

BACKGROUND OF THE INVENTION

The present invention relates to a recording and/or reproducing apparatus incorporating a hard disc drive, an optical disc drive, a solid state drive, etc.

JP-A-2007-4707 has been proposed as a related art. This document discloses an assignment of realizing an interface device capable of accessing to a plurality of devices from a host device via a single serial interface. For a purpose of realizing the assignment, this document discloses a technique such that an interface, conformed to a serial ATA (Advanced Technology Attachment) capable of connecting the devices with an external device, is incorporated respectively on the devices to thereby connect the devices with each other. Address map information is then created from a total amount of capacity of recording areas on all of the connected devices. In consequence, the host device can access to all other devices by causing connection with a single device.

In recent years, the interface conformed to the serial ATA standard has often been used for connecting personal computers (hereinafter, referred to as PC) with peripheral devices (device). The PC requires a serial ATA interface for each of the devices when the plural devices are connected to the PC. Further, the devices also require interface units, respectively. Therefore, connecting with the plural devices increases a power consumption caused by the interface units alone.

The above-mentioned background technique discloses that the host device transfers data with the plural devices via the single serial interface unit. However, it is required that a new interface conformed to the serial ATA is incorporated additionally and respectively on the devices, for connecting between the devices. In consequence, the power consumption is increased.

Further, there has been a function of such a port multiplier in the serial ATA standard. The port multiplier means a function of connecting the device having a single port incorporated with the plurality of serial ATA interfaces. By using this function, the host device may have one single ATA interface alone when the plural devices are connected to the host device. However, the power consumption is still increased since the respective devices require the serial ATA interface.

SUMMARY OF THE INVENTION

An object of the invention is to provide a recording and/or reproducing apparatus including a plurality of devices, however, reducing the power consumption.

According to the invention, the recording and/or reproducing apparatus has an aspect such that a first device has a connecting unit to be connected with a host device to perform a data transfer with the host device, a second device shares a temporarily recording area with the first device to perform the data transfer between the first and second devices via the temporarily recording area, and the data transfer is performed by using the temporarily recording area shared with the first device and using the connecting unit of the first device when the second device performs the data transfer with the host device.

According to the above-mentioned configuration, the recording and/or reproducing apparatus incorporating the plurality of devices can realize to reduce the power consumption.

The other objects, features and advantages of the invention will become apparent from the following description of the embodiments of the invention taken in conjunction with the accompanying drawings.

DESCRIPTION OF THE EMBODIMENTS

Hereinafter, embodiments of the invention will be described with reference to the drawings.

First Embodiment

Figure 1:
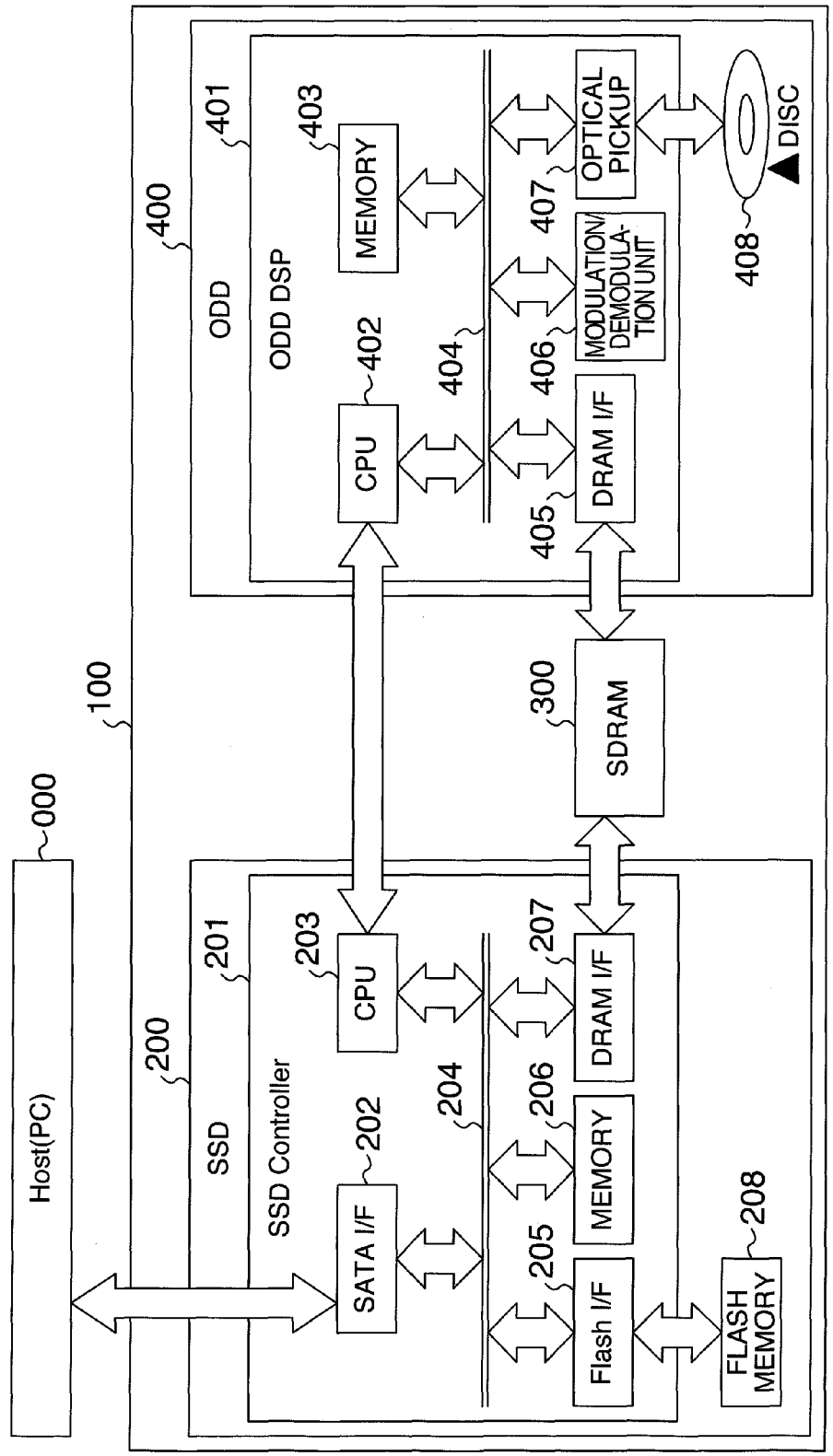
FIG. 1 is a block diagram showing a recording and/or reproducing apparatus in a first embodiment of the invention.

FIG. 1 is a block diagram showing a recording and/or reproducing apparatus in a first embodiment of the invention. First, in a configuration shown in the block diagram, a reference numeral 000 denotes a host device as a high-level device. A recording and/or reproducing apparatus 100 is configured of a nonvolatile memory drive (hereinafter, referred to as solid state drive SSD) 200, an optical disc drive (hereinafter, referred to as ODD) 400, and an SDRAM 300 as a recording area shared the SSD 200 with the ODD 400. The SSD 200 is configured of an SSD controller 201 and a flash memory 208 as a recording medium. The SSD controller 201 is configured of a serial ATA interface 202, a CPU 203, a bus 204, a flash memory interface 205, a memory 206 used for the CPU 203, and a DRAM interface 207. The ODD 400 is configured of an ODD signal processing unit 401 and a disc 408 to be loaded on the ODD 400 as a recording medium. In addition, a servo system circuit, a spindle motor, etc. are omitted in FIG. 1 for sake of simplicity. The ODD signal processing unit 401 is configured of a CPU 402, a memory 403 used for the CPU 402, a bus 404, a DRAM interface 405, a modulation and/or demodulation unit 406, and an optical pickup 407. In addition, arrows in FIG. 1 indicate a data communication between the respective units. The CPU 203 controls the SSD controller 201, and the CPU 402 controls the ODD signal processing unit 401.

The following description will be concerned with a command communication when performing a data transfer between the host device 000 and the recording and/or reproducing apparatus 100. In addition, with the command communication, a device selection, a transfer mode setting, a device state confirmation, etc. are performed between the host device 000 and the recording and/or reproducing apparatus 100. The device described in this embodiment is equivalent to a drive such as the SSD 200 and ODD 400 unless otherwise shown.

The data transfer between the host device 000 and the recording and/or reproducing apparatus 100 is performed through the serial ATA interface 202, and also performed in a procedure conformed to the serial ATA standard. When accessing to the devices from the host device 000, the CPU 203 receives a command issued from the host device 000 via the serial ATA interface 202 to then identify whether the received command is used for the SSD 200 or the ODD 400. If the command is used for the SSD 200, the CPU 203 determines the operation of SSD 200 in response to the received command. If the received command by the CPU 203 is used for the ODD 400, the CPU 203 notifies the command to the CPU 402 in ODD 400. The CPU 402 then determines the operation of ODD 400 in response to the received command.

Conversely, when accessing to the host device 000 from the ODD 400, the CPU 402 in the ODD 400 notifies the command to the CPU 203 in the SSD 200, and the CPU 203 notifies the command to the host device 000 via the serial ATA interface 202.

In addition, the command communication may be performed by the following manner other than the above-mentioned operation between the CPUs, each of which is resided in the respective devices.

First, an area for storing the command is secured in the SDRAM 300, and the command communication is performed through that area. For example, when the host device 000 performs the data transfer with the ODD 400, the CPU 203 receives the command issued from the host device 000. The CPU 203 then identifies that the command is used for the ODD 400, records the command in a recording area of the SDRAM 300, and notifies to the CPU 402 that an access request comes from the host device 000. In consequence, the ODD 400 refers to the command recorded on the SDRAM 300 to then set the operation of ODD 400.

As the manner described above, the command communication can be performed between the host device 000 and the SSD 200 and between the host device 000 and the ODD 400.

Figure 2:
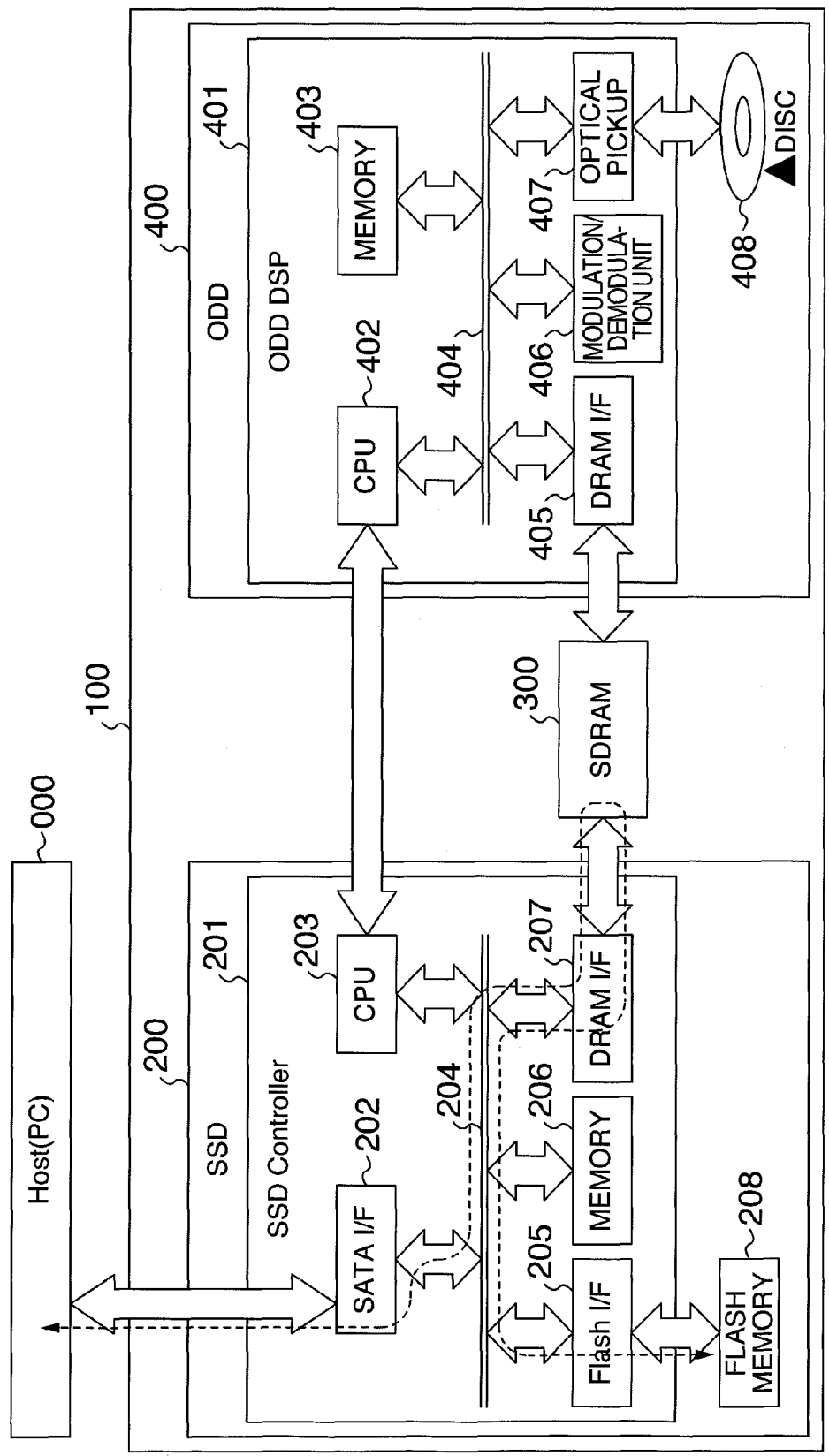
FIG. 2 is a diagram showing a data flow between a first device or drive and a host device.

Next, of the data transfer between the host device 000 and the recording and/or reproducing apparatus 100, the data transfer between the host device 000 and the SSD 200 will be described below. In addition, a data flowing path is indicated by a dotted line in FIG. 2.

When the data is transferred from the host device 000 to the SSD 200, the data transfer is performed through the serial ATA interface 202. Specifically, the data transferred from the host device 000 is recorded in the SDRAM 300, as a temporarily recording area, via the DRAM interface 207. The data is then written in the flash memory 208, as a recording medium, via the flash memory interface 205.

When the data is transferred from the SSD 200 to the host device 000, a procedure opposite to the above-mentioned procedure is applied to that transfer.

Figure 3:
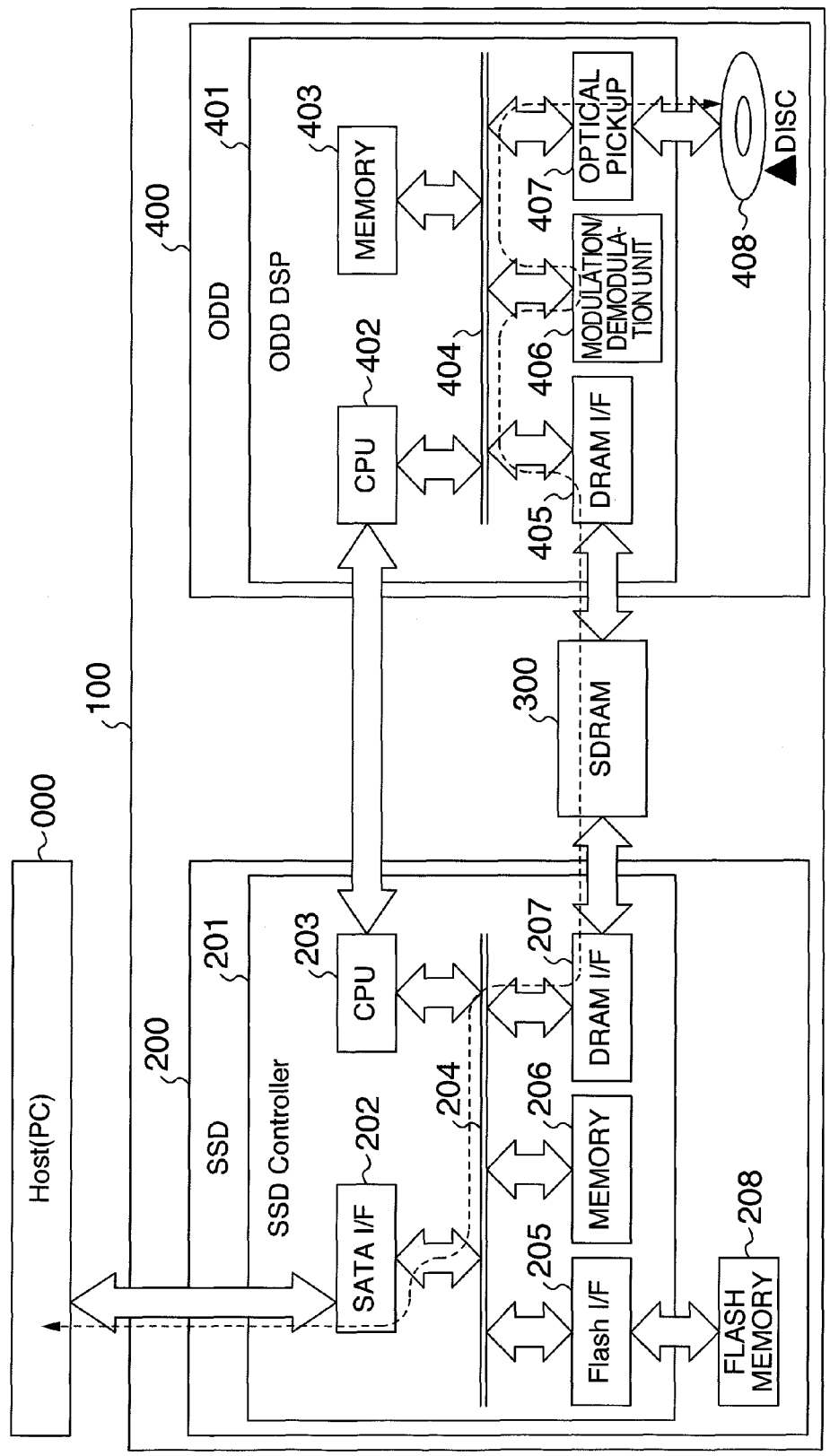
FIG. 3 is a diagram showing another data flow between a second device or drive and the host device.

Next, of the data transfer between the host device 000 and the recording and/or reproducing apparatus 100, the data transfer between the host device 000 and the ODD 400 will be described below. In addition, a data flowing path is indicated by a dotted line in FIG. 3. When the data is transferred from the host device 000 to the ODD 400, the data transfer is performed through the serial ATA interface 202. The data transferred from the host device 000 is recorded in the SDRAM 300, as the temporarily recording area, via the DRAM interface 207. Thereafter, the CPU 203 notifies to the CPU 402 that the data is recorded in the SDRAM 300. After notifying to the CPU 402, the ODD 400 receives the data stored on the SDRAM 300 via the DRAM interface 405 to then send to the modulation/demodulation unit 406. The modulation/demodulation unit 406 modulates the data, as received, to a write format matched to the disc 408 to then write the data in the disc 408 by the optical pickup 407.

When the data is transferred from the ODD 400 to the host device 000, the optical pickup 407 reads out the data recorded on the disc 408, and the modulation/demodulation unit 406 demodulates the data. The data is then transferred to the host device 000 via the SDRAM 300 and the serial ATA interface 202 by a procedure opposite to the case of transferring the data from the host device 000.

According to the above-mentioned manner, the recording and/or reproducing apparatus 100 having the plurality of drives 200, 400 only requires one single serial ATA interface as a communication unit to be communicated with the host device 000. Further, a new serial ATA interface is not required since the data transfer between the devices or drives is also performed through the SDRAM 300 shared the drive 200 with the drive 400, so that it is possible to reduce the power consumption.

Figure 4:
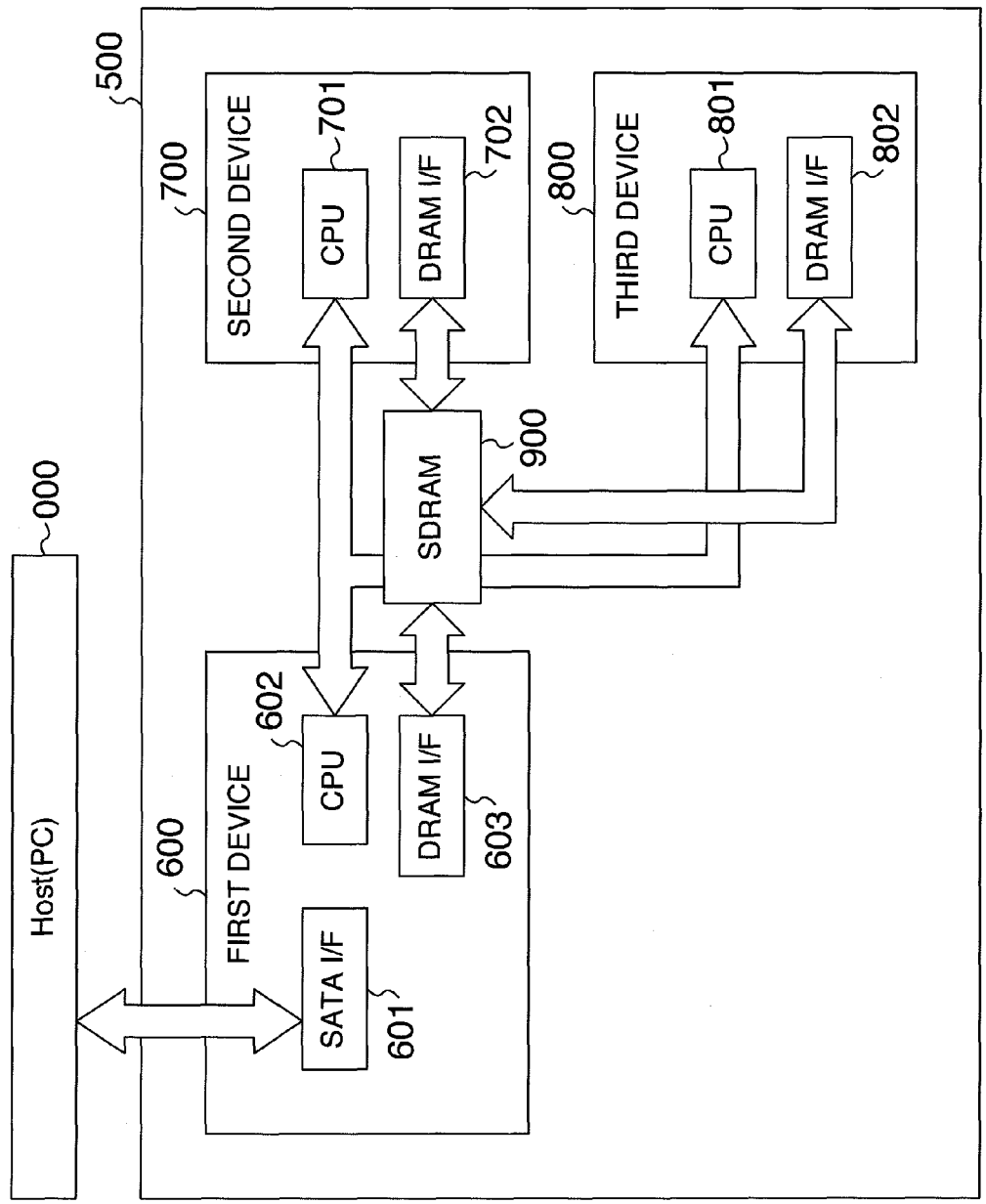
FIG. 4 is a block diagram showing another recording and/or reproducing apparatus incorporating three devices in a second embodiment of the invention.

A second embodiment will be described below. Incidentally, the above-mentioned embodiment has described with the two drives 200, 400 incorporated on the recording and/or reproducing apparatus 100, however, the recording and/or reproducing apparatus 100 may provide more than three devices or drives. FIG. 4 shows a specific example of incorporating three devices on the recording and/or reproducing apparatus 100. In FIG. 4, a reference numeral 000 is the host device already illustrated in FIG. 1. A reference numeral 500 denotes a recording and/or reproducing apparatus which incorporates three devices: a first device 600, a second device 700 and a third device 800. In addition, FIG. 4 only shows connections between the host device 000 and the devices and between elements to be required for a communication, and other elements are omitted for sake of simplicity. When the first device 600 and second device 700 perform the data transfer with the host device 000, the transfer is similarly performed as mentioned above. When the third device 800 performs the data transfer with the host device 000, the transfer is performed through a SDRAM 900 as a shared memory area and a serial ATA interface 601 in the first device 600, similarly to the case where the second device 700 performs the data transfer with the host device 000. In this way, the connection with the host device 000 is single even though the more than three devices are incorporated in the recording and/or reproducing apparatus 500, so that it is possible to reduce the power consumption. In addition, FIG. 4 shows that the three devices share with one SDRAM 900, however, the devices may be connected so as to be a cascaded connection, and a shared recording area is mounted on every adjacent device. Further, the command may also be delivered and received through a few CPUs when transferring it between the CPUs. In addition, the devices 600, 700 and 800 are equivalent to the drives such as the SSD 200 and ODD 400 in the first embodiment unless otherwise shown.

Second Embodiment

The following description will be concerned with a method where the host device 000 is connected with the recording and/or reproducing apparatus 100 to then acknowledge two devices: the SSD 200 and ODD 400. The recording and/or reproducing apparatus 100 is connected with the host device 000 to receive an acquisition request, from the host device 000, of information regarding the devices, such as the number of devices being connected and a device condition. The recording and/or reproducing apparatus 100 then notifies the number of devices being connected and the information of the SSD 200 and ODD 400, to the host device 000 under the communication protocol conformed to the serial ATA standard, via the serial ATA interface 202. For example, the information of the two devices (SSD 200 and ODD 400) is notified to the host device 000 under the communication protocol of the command and data specified by a port multiplier function in the serial ATA standard. In this way, the host device 000 can acknowledge that it is connected with the devices having the port multiplier function and with the two devices or drives: the SSD 200 and ODD 400. Alternatively, the information of the two devices is notified to the host device 000, and the host device 000 may then acknowledge that it is connected with the devices, under the communication protocol of the command and data in another serial ATA standard. The presence of the devices and their information are notified to the host device 000 by using an independent communication unit, and the host device 000 may acknowledge the two devices. In addition, the acquisition of the information etc. regarding the SSD 200 and ODD 400 is performed through the serial ATA interface 202 as described in the first embodiment.

Figure 5:
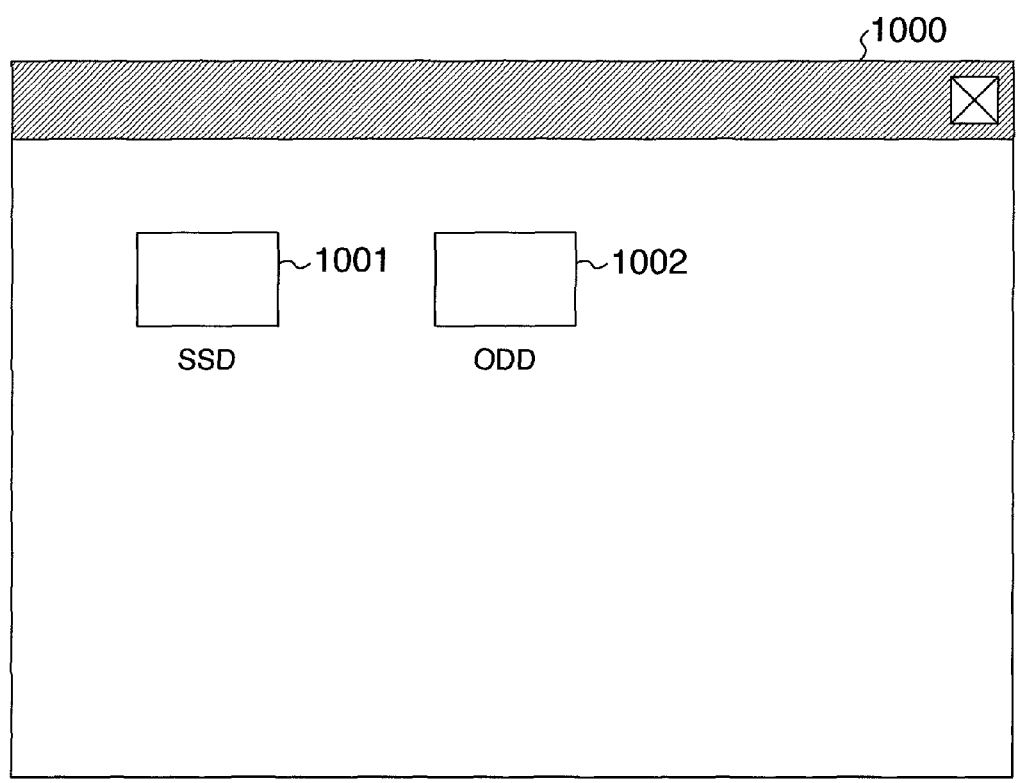
FIG. 5 is a specific diagram showing that a plurality of devices or drives incorporated in the recording and/or reproducing apparatus are distinguished to display on a widow screen for a user.

According to the above-mentioned method, the host device 000 can distinctly acknowledge the devices or drives SSD 200 and ODD 400 incorporated on the recording and/or reproducing apparatus 100, and the two devices can be displayed such that they are connected individually. For example, as shown in FIG. 5, icons as indicated by reference numeral 1001, 1002 for the respective drives are displayed on a window screen 1000. In consequence, the recording and/or reproducing apparatus itself can display thereon such that it assumes that a user can see two drives each connected individually even though the SSD 200 is integrated with the ODD 400, so that it is possible that the user can acknowledge the respective drives.

Third Embodiment

The following description will be concerned with the data transfer between the devices without transferring through the host device 000. For example, when the data recorded on the SSD 200 is copied to the ODD 400 or the recording/reproducing apparatus 100 receives a copy request from the host device 000, the data recorded on a flash memory 208 in the SSD 200 is recorded in the SDRAM 300 via the flash memory interface 205 and the DRAM interface 207. The CPU 203 notifies to the CPU 402 that the data is recorded in the SDRAM 300. The CPU 402 receives the notification and the ODD 400 then receives the data recorded on the SDRAM 300 via the DRAM interface 405. The modulation/demodulation unit 406 then modulates the data to record the data in the disc 408 by using the optical pickup 407.

According to the above-mentioned method, the data on the SSD 200 can be copied to the disc 408 in the ODD 400 without transferring through the host device 000.

In addition, the invention is not limited to the above-mentioned embodiments. In implementation of the embodiments, the constituent elements can be changed and appeared in concrete without departing from scope of the executive summary. For example, in the first embodiment, the serial ATA interface 202 is incorporated in the SSD 200. However, the serial ATA interface 202 may be incorporated in the ODD 400, not in the SSD 200, and the respective drives 200, 400 then perform the data transfer with the host device 000 via the serial ATA interface 202. Further, various inventions can be realized by appropriately combining a plurality of constituent elements disclosed in the above-mentioned embodiments. For example, some constituent elements may be deleted from the entire constituent elements described in the embodiments. Furthermore, the constituent elements described in different embodiments may also be combined appropriately.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording and/or reproducing apparatus including a plurality of devices for writing in and reading out data and a temporarily recording area shared by the plurality of devices to perform a data transfer between the devices via the temporarily recording area, wherein,
    a first device of the plurality of devices includes a connecting unit connected with a high-level device to perform the data transfer with the high-level device,
    a device other than the first device among the plurality of devices, performs the data transfer with the high-level device via the connecting unit in the first device and the temporarily recording area, and
    when the data transfer is performed between the first device and the device other than the first device without transferring through the high-level device, or between the high-level device and the first device, a command for the data transfer is transferred via the temporarily recording area shared by the plurality of devices or via a CPU included in each of the plurality of devices, and
    when the data transfer is performed between the first device and the device other than the first device through temporarily recording area, or between the high-level device and the device other than the first device through the temporarily recording area, a communication of a command required for the data transfer is performed between the CPU in the first device and the CPU in the device other than the first device.

2. The apparatus according to claim 1, wherein number of the devices in the plurality of devices incorporated in the recording and/or reproducing apparatus, is two devices.

3. The apparatus according to claim 1, wherein the data transfer is performed between the devices incorporated in the recording and/or reproducing apparatus, without transferring through the high-level device.

4. The apparatus according to claim 2, wherein the first device is a solid state drive, and the device other than the first device is an optical disc drive.

5. The apparatus according to claim 2, wherein the first device is an optical disc drive, and the device other than the first device is a solid state drive.

6. The apparatus according to claim 1, wherein a connection with the plurality of devices is notified to the high-level device, when connecting with the high-level device.

7. The apparatus according to claim 6, wherein the plurality of devices notify to the high-level device such that the plurality of devices are connected with the high-level device by a port multiplier function, when the high-level device is connected with the connecting unit under a protocol conformed to a serial ATA standard.

8. The apparatus according to claim 1, wherein a communication of a command required for the data transfer, is performed between a CPU in the first device and a CPU in the device other than the first device, to transfer data through the temporarily recording area, when performing the data transfer between the first device and the device other than the first device, or the high-level device and the device other than the first device.

9. The apparatus according to claim 2, wherein a transfer of the command required for the data transfer and a transfer of the data are performed through the shared temporarily recording area, when performing the data transfer between the first device and the device other than the first device, or the high-level device and the device other than the first device.

* * * * *